April 27, 1954

R. D. EMMONS 2,676,758

HEATING APPARATUS FOR USE IN VACUUM, VAPOR, OR LOW-PRESSURE HEATING SYSTEMS

Filed Nov. 22, 1948

INVENTOR.
Roy D. Emmons
BY
Harry G. Martin Jr.
atty.

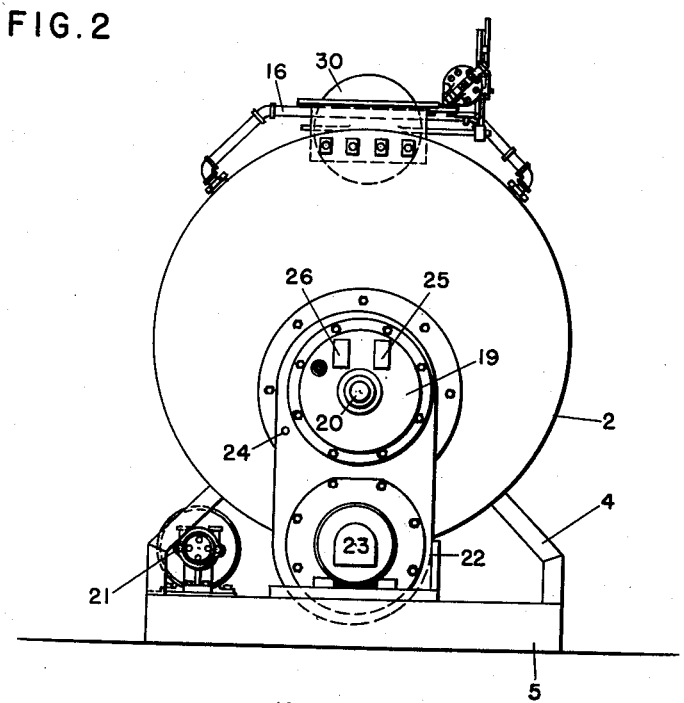
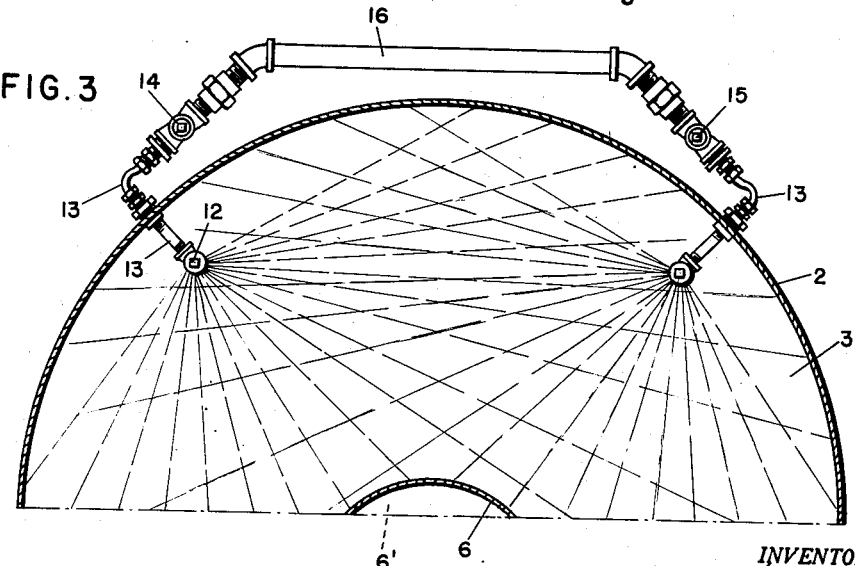

April 27, 1954 R. D. EMMONS 2,676,758
HEATING APPARATUS FOR USE IN VACUUM, VAPOR, OR
LOW-PRESSURE HEATING SYSTEMS
Filed Nov. 22, 1948 5 Sheets-Sheet 4

INVENTOR.
Roy D. Emmons
BY Harry G. Martin, Jr.
Atty.

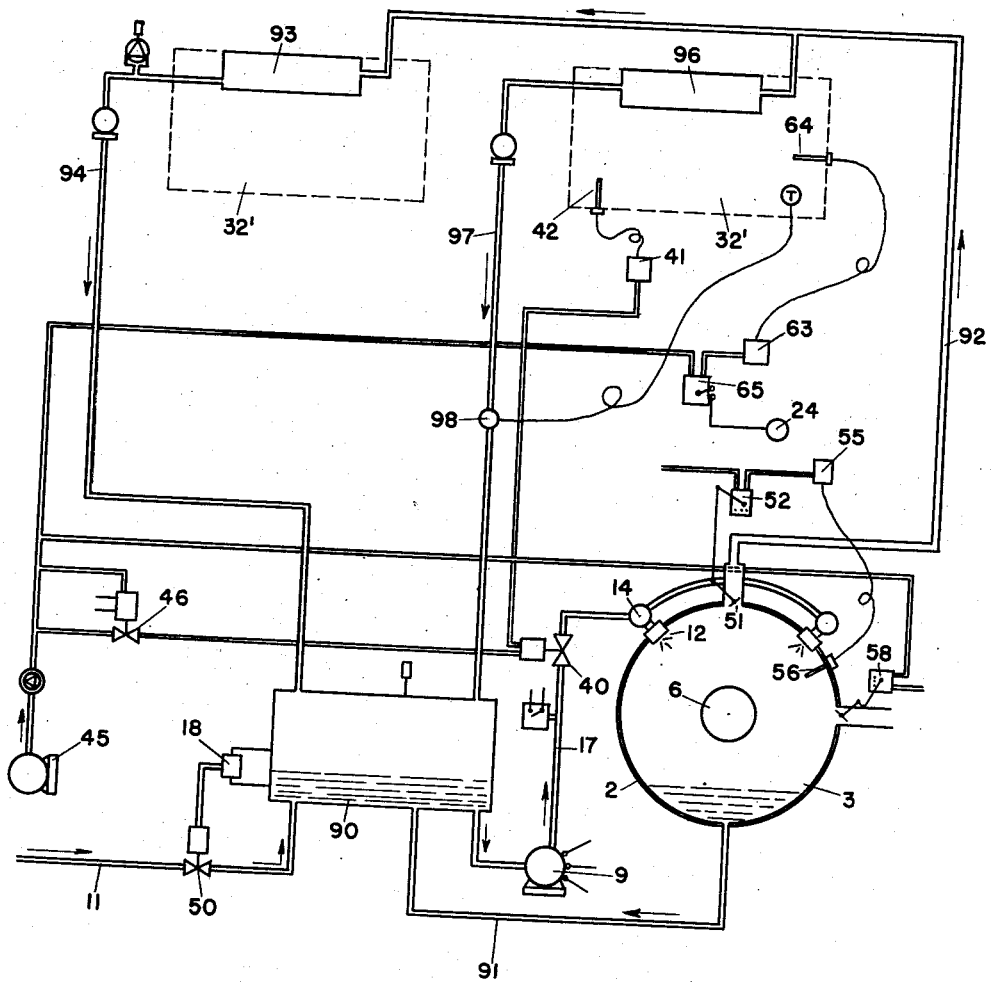

Patented Apr. 27, 1954

2,676,758

UNITED STATES PATENT OFFICE 2,676,758

HEATING APPARATUS FOR USE IN VACUUM, VAPOR, OR LOW-PRESSURE HEATING SYSTEMS

Roy D. Emmons, Syracuse, N. Y.

Application November 22, 1948, Serial No. 61,498

10 Claims. (Cl. 237—9)

This invention relates to heating apparatus for use in a vacuum, vapor or low pressure heating system and, more particularly, to apparatus in which the sensible heat of gases for supply to areas to be conditioned is changed in large part to latent heating thereby increasing the efficiency and economy of the system.

The chief object of the present invention is to provide heating apparatus for use in a vacuum, vapor or low pressure heating system which is inexpensive in initial cost and economical in operation.

An object is to provide heating apparatus for use in a vacuum, vapor or low pressure heating system which serves to increase the sensible heat of gases for supply to an area to be conditioned and simultaneously changes the sensible heat of the gases into latent heat to increase the efficiency and economy of the system.

A further object is to provide heating apparatus for use in a vacuum, vapor or low pressure heating system in which water is sprayed into the heated gases to form saturated steam, the force of expansion of the gases at low pressure being utilized to supply the saturated steam to an area being heated.

A still further object is to provide heating apparatus for use in a vacuum, vapor or low pressure heating system in which the quantity of water sprayed into the heated gases is regulated in accordance with the temperature of the areas being conditioned or in accordance with the sensible heat of the saturated gases being supplied to such areas.

A still further object is to provide suitable controls for the heating apparatus employed in a vacuum, vapor or low pressure heating system.

A still further object is to provide a low pressure heating system affording high temperatures limited only by the temperature characteristics of the elements involved.

A still further object is to provide heating apparatus for curing cementitious modular shapes at economical cost.

This invention relates to heating apparatus for use in a vacuum, vapor or low pressure heating system which comprises in combination a compartment, a cylinder in said compartment, heating means extending into the cylinder to heat gases in said compartment, means in said cylinder to maintain a desired static pressure therein, and spray members for injecting liquid into the compartment, the spray vaporizing to change a substantial portion of the sensible heat of the gases in the compartment into latent heat and to increase the volume of the gases therein.

This invention further relates to apparatus for curing cementitious modular shapes which comprises a kiln, a heater for heating gases for supply to the kiln to a desired temperature, means in said heater for spraying water into the heated gases thereby changing the sensible heat of the gases into latent heat and expanding the same, and means for supplying the expanded gases from the heater to the kiln.

The attached drawings illustrate a preferred embodiment of my invention, in which Figure 1 is a view in front elevation of the heating apparatus of my invention;

Figure 2 is a view in end elevation of the heating apparatus shown in Figure 1;

Figure 3 is a fragmentary sectional view taken on the line 3—3 of Figure 1;

Figure 6 is a diagrammatic view of the heating apparatus employed in a vacuum or vapor heating system.

Figure 1:
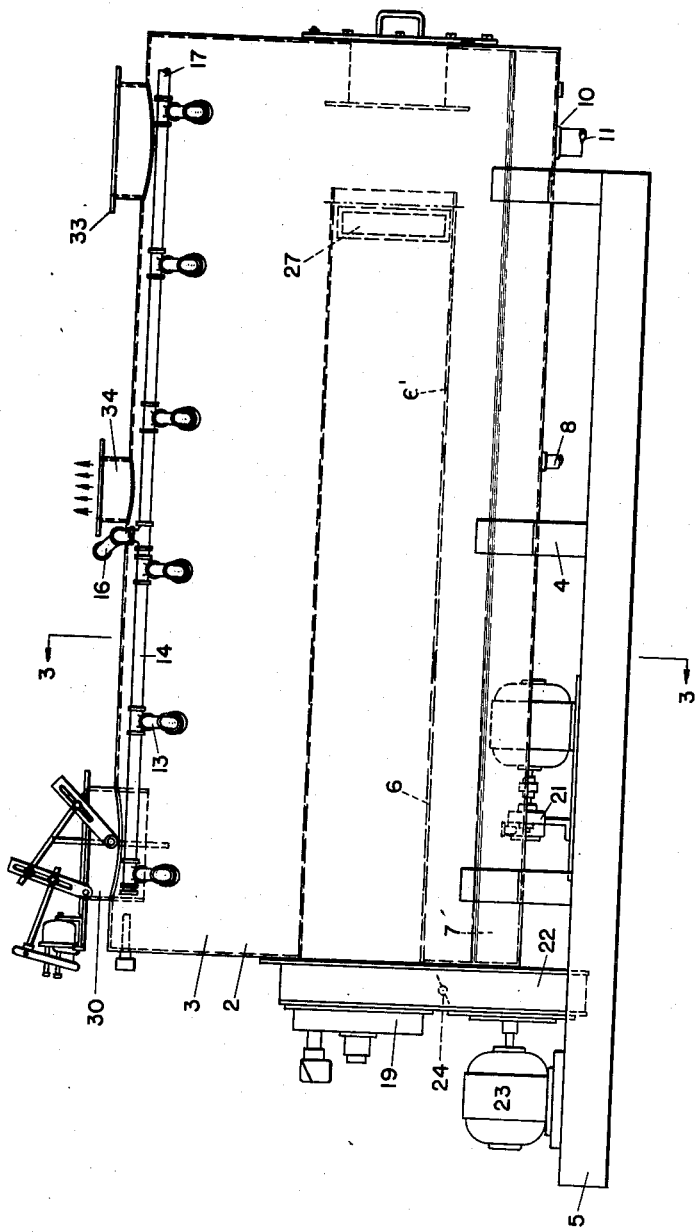

Referring to the drawings, there is shown the heating apparatus of the present invention. Such apparatus includes a cylindrical drum 2 forming a compartment 3 in which products of combustion combine with water to form superheated steam. Legs or braces 4 support drum 2 upon a base 5. A cylinder 6 extends longitudinally in drum 2 to form a firing chamber 6' and may be formed of stainless steel or other material capable of resisting corrosion and the high temperatures to which it is subjected.

A sump 7 is formed in the base of drum 2 and is connected by line 8 to a water pump 9. A suitable connection 10 is provided in drum 2 for make-up water furnished through line 11 from a suitable source of supply (not shown) such as city water, wells and the like. A plurality of atomizing spray nozzles extend within compartment 3. Members 12 are connected by pipes 13 to headers 14 and 15 disposed on opposite sides of drum 2. Header 15 is connected to header 14 by pipe 16. Header 14 is connected to pump 9 by line 17. A limit control 18 maintains a desired water level in sump 7.

Adjacent one end of drum 2 is an oil burner designated generally at 19 which serves to ignite a mixture of oil and gas such as air to heat cylinder 6. Oil burner 19 may be a cyclonic type direct fired oil burner such as the "Cyclotherm" burner. Burner 19 includes the usual nozzle 20 connected to an oil pump 21. A blower 22 actuated by motor 23 furnishes air for supply to the burner 19 at a pressure of ten to sixteen inches water gauge. A damper 24 regulated automatically as hereinafter described maintains a predetermined oil-air ratio. A flame eye 25 and pilot detector 26 are provided to discontinue operation of the burner 19 if a flame is not established within a predetermined time interval.

Burner 19 ignites the mixture of oil and air, the ignited mixture taking a spiral passage through cylinder 6. It will be appreciated burner 19 develops gas temperatures in the firing chamber 6' above 2100° F. A baffle 27 is provided adjacent the opposite end of cylinder 6 to maintain a predetermined static pressure within the firing chamber 6'. This type of direct fired oil burner so utilized is well-known and does not require an extended description. The heat of burning gases passing through cylinder 6 is converted into superheated steam by radiation through the wall of cylinder 6 and by the direct contact of the combustion gases with atomized spray. Preferably, suitable timing mechanism (not shown) is provided to start and to stop the burner 19 automatically at desired time intervals.

The spray members 12 supply an atomized stream of moisture into the heated gases in compartment 3. Absorption of the moisture so provided by the heated gases changes the sensible heat of the gases into the latent heat of superheated steam. If temperatures below boiling point are desired, a saturation of approximately 85% may be maintained. The saturation of the gases simultaneously increases the volume of the gases approximately 300%. In accordance with the present invention, sufficient water is absorbed in compartment 3 to reduce the sensible heat to the dry bulb temperatures required for use in space heating units, process heating units, or direct heating in ovens or kilns. In experimental installations, temperatures as great as 750° F. have been obtained.

Spray nozzles 12 are arranged in drum 2 (refer to Figure 3) to discharge spray toward the outside wall of cylinder 6 enclosing firing chamber 6'. The combination of the cyclonic motion of the gases inside chamber 6' and the water film outside the chamber develops a high rate of conduction which absorbs a large portion of the generated heat from the wall of the firing chamber 6'. Spray nozzles 12 also direct spray toward the interior wall of the cylinder in effect forming an insulating film on such wall through which no temperature above boiling point may be transmitted thus eliminating any need for insulation about drum 2.

Outlet 30 is provided in drum 2 and is connected by a duct or pipe 70 to an area 32 to be heated. A return inlet 33 may also be provided. Port 34 in chamber 3 is a scavenger port and scavenges chamber 6' and compartment 3 at start-up or in the event of smoky flames.

Supply of water to spray nozzles 12 is regulated automatically by a pneumatically operated valve 40 disposed in line 17. Valve 40 is governed by thermostatic control 41 actuated by a bulb element 42 disposed in the area being heated or if desired adjacent outlet 30 in drum 2. Bulb element 42 is responsive to the dry bulb temperature of the gases leaving drum 2 in the latter case to actuate control 41 to move valve 40 toward open or closed positions. Valve 40 is connected through line 43 to main air line 44 to which air under pressure is supplied by compressor 45. A solenoid valve 46 is placed in line 43 if desired to close the line to the passage of compressed air. Air line 47 connects control 41 with valve 40, control 41 containing a vent (not shown) through which air bleeds to the atmosphere. Bulb element 42 in response to temperature changes opens or closes the vent permitting pressure to increase or to decrease upon the diaphragm of valve 40 to move its valve member away from or toward the port through the valve. Pneumatically operated valves and controls of this type are well-known.

As previously stated, limit control 18 serves to maintain a desired volume of water in sump 7. When the water level in sump 7 falls to a point indicated at X in Figure 5, control 18 opens solenoid valve 50 in line 11 permitting make-up water to be supplied to sump 7. When the water level in sump 7 increases to a desired point marked Y in Figure 5, control 18 closes valve 50 to discontinue passage of make-up water to sump 7.

Dampers 51 are placed adjacent the outlet 30 of drum 2 to regulate pressure in compartment 3. Preferably, the pressure in compartment 3 is maintained between two inches and seven and one-half inches water gauge thereby stabilizing combustion. Dampers 51 are operated by a pneumatic motor 52 connected by secondary air line 53 to main air line 44 and by secondary air line 54 to pressure control 55. Control 55 is similar to control 41 and is actuated by a bulb element 56 disposed in compartment 3 responsive to the pressure therein.

Dampers 57 are placed in scavenger port 34, dampers 57 being operated by a pneumatic motor 58 connected by secondary air line 59 to main air line 44. Another secondary air line 60 permits air pressure applied to motor 58 to be vented. A solenoid valve 61 is placed in line 60 and is moved to open or closed positions by a combustion recognition control 62. Control 62 is disposed to "see" inside of firing chamber 6' adjacent baffle 27. Such damper and control permits compartment 3 and firing chamber 6' to be scavenged at start-up or in the event smoky flames are created during operation of the heating apparatus.

A thermostatic control 63 serves to regulate burner damper 24 and also a modulating valve 24' in the oil line to the burner in response to heat demands of the area being treated. Control 63 is also similar to controls 41 and 55 and is actuated by a bulb element 64 disposed in the area being treated and responsive to the temperature therein. Control 63 operates a pneumatic motor 65 to move damper 24 toward open or closed positions and is connected to motor 65 by secondary air line 66, motor 65 being connected to main air line 44 by secondary air line 67.

Pressure limit controls 68 and 69 are disposed in air line 44 and in line 8 respectively to assure desired air and water pressures.

Figure 4:
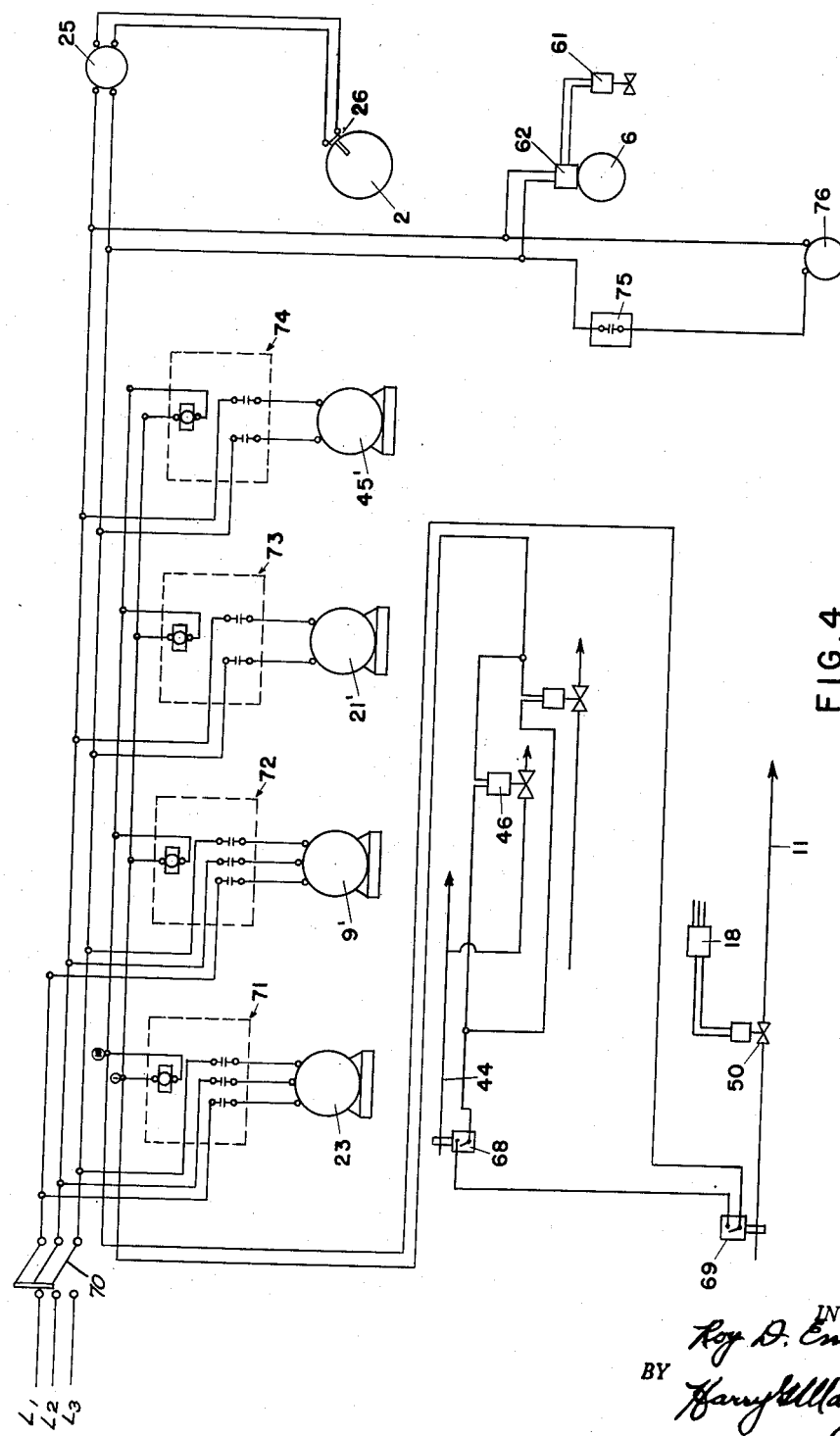
Figure 4 is a diagrammatic view of the electrical control circuit for the heating apparatus shown in Figure 1.

In Figure 4, I have shown the electrical circuit connecting the various controls, solenoid valves, motors, etc. of the control arrangement. The circuit so shown is connected to the automatic timing mechanism of burner 19 in such manner that three phase current enters the circuit from a suitable source through lines $L_1$, $L_2$ and $L_3$.

Switch 70 is disposed to make or break the connections to energize or to disconnect the shown circuit from the source of power. Through relays 71, 72, 73 and 74 current is provided to the motor 23 of blower 22, the motor 9' of water pump 9, the motor 21' of oil pump 21 and the motor 45' of compressor 45. The various solenoid valves heretofore described are connected in the circuit as shown. Flame-eye 25 is connected in lines $L_2$ and $L_3$. Pilot detector 26 is connected to the flame-eye. As previously stated, automatic timing mechanism (not shown) is provided to start oil burner 19. After about ten seconds, the mechanism closes a contact that starts blower 22, water pump 9, oil pump 21 and gas electric ignition. After a predetermined interval of ten to twenty-five seconds the mechanism closes a circuit to the oil valve provided the switch in series with this circuit has been closed by the pilot detector having already recognized the ignition flame. Oil then flows through nozzle 20 and is atomized in contact with the ignition flame and combustion is established.

In the event that flame is not recognized by the flame-eye 25 within ten seconds after the oil valve opens, the mechanism goes into a safety lockout and requires manual starting; otherwise, the mechanism completes its cycle and stops in position for the next automatic or manual demand.

If there is an interruption by flame failure after the cycle is completed, burner 19 is instantly locked out. In the event of power failure, the burner stops but automatically goes through another starting cycle when power is resumed.

I have also shown a temperature limit control 75 connected to lines $L_2$ and $L_3$ adapted to actuate the motor 76 of fan 77 hereinafter described.

Figure 5:
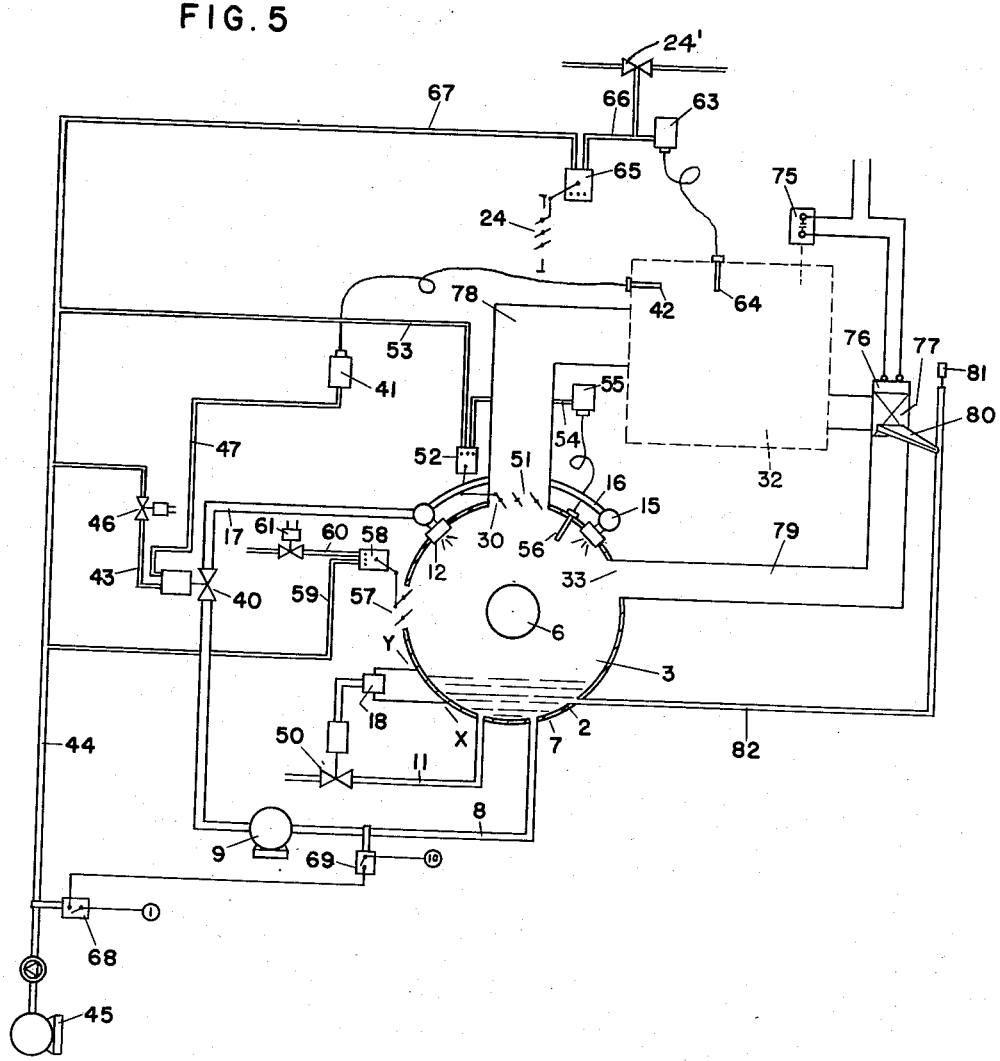
Figure 5 is a diagrammatic view of the heating apparatus employed in the manufacture of cementitious modular shapes.

In Figure 5, I have shown the heating system of the present invention applied to a kiln 32 for curing cementitious modular shapes. The heater 2 provides heated gases of at least 85% saturation for supply through duct 78 to kiln 32. I have shown a return duct 79 connecting kiln 32 and inlet 33 of compartment 3. Fan 77 is disposed in duct 79 and is actuated in response to temperature low limit control 75, to remove gases from the kiln and to return such gases to compartment 3. A skimmer 80 is provided at fan 77 and serves to remove a minor portion of the return vapor from duct 79, the removed gases being vented through line 81 while condensate is returned to sump 7 through return line 82.

Cementitious modular shapes are molded to desired contour in mold machines and are then placed on racks in kiln 32 to be cured. Assume the automatic timing mechanism of burner 19 has been adjusted for desired time intervals and that the burner is operating satisfactorily to ignite and burn a desired mixture of oil and gas within firing chamber 6'.

Gases in compartment 3 are heated by cylinder 6 to a dry bulb temperature of 400–600° F. Atomizing spray nozzles 12 discharge fine sprays of water into the heated gases. The spray is directed toward cylinder 6 and toward the interior wall of drum 2. Water is supplied to nozzles 12 from sump 7 by pump 9. Water not vaporized by the heated gases is returned to the sump. Discharge of spray into the heated gases changes the sensible heat of such gases into latent heat and greatly increases the volume thereof. Moisture condenses on the interior wall of drum 2 and forms a sheet or film which in effect insulates the heated gases from the ambient atmosphere.

Compartment 3 is connected to kiln 32 by supply duct 78 and by return duct 79. The saturated gases are forwarded to kiln 32 through duct 78. I have found that the forces of expansion of the heated gases in compartment 3 are adequate to forward the gases to the kiln 32 at a rate of 600–800 C. F. M. Fan 77 in effect serves as a check valve to assure the desired direction of movement of the saturated gases. Fan 77 may be employed to remove cooler gases in the kiln 32 adjacent the floor and to return such gases to compartment 3 for reheating. In this connection, skimmer 80 is of value to remove non-condensible gases from the kiln since it serves to skim off a minor portion of the return flow, releasing the non-condensibles to the atmosphere and returning condensate to sump 7.

Damper 51 is utilized to maintain static pressure in compartment 3 between two inches and seven and one-half inches water gauge to stabilize combustion. It is regulated by control 55 actuated by element 56 disposed in compartment 3.

Passage of water to nozzles 12 is regulated by valve 40 actuated by control 41 in response to the temperature in kiln 32 as sensed by element 42. If desired, element 42 may be disposed adjacent outlet 30 to respond to the dry bulb temperature of the saturated gases leaving compartment 3. Control 63 regulates the damper 24 of the burner 19 and the valves in the oil lines in response to the temperature of kiln 32.

When predetermined pressure is developed in compartment 3, control 55 opens damper 51 to permit gases to pass to the kiln and control 63 takes command of burner input. If conditions require, control 41 regulates valve 40 to modulate passage of water to spray nozzles 12.

Considering the process of curing the cementitious shapes, the formed shapes are placed in kiln 32 on racks. The doors of the kiln are then closed and curing is ready to proceed. It will be appreciated the shapes at such time contain moisture remaining from the forming operation. It is essential that such moisture be retained while the shape is heated during the curing process to prevent crazing, spalling, or cracks which would result if the temperature of the shape were raised rapidly. Heating the shape rapidly removes such water from the exterior of the shape while the shape retains moisture in its interior thus permitting undesirable and uneven contraction and expansion during the curing process.

Burner 19 is operated to heat gases in compartment 3 to a temperature within the range of 400–600° F. Simultaneously, water is sprayed into the heated gases by nozzles 12. The heated gases absorb the sprayed water to at least about 85% saturation changing the sensible heat of the gases to latent heat and greatly expanding the gases. Water not absorbed falls to the sump. Condensate collects on the interior wall of the drum thus shielding and insulating the heated gases from ambient atmosphere. Temperature of the saturated gases at the outlet 30 of the drum is within the range of 225°–275° F. and is maintained within such range by controls 41 and 55.

The saturated gases supplied to the kiln 32 over the surfaces of the shapes therein may be supplied for a period of about 20 minutes. The heated gases raise the temperature of the shapes to about 170° F. and increase slightly the amount of moisture contained therein. It will be appreciated if the heated gases were not saturated it would be impossible to raise the shapes from room temperature in such a short time for crazing or cracking would result by removal of moisture from the block. My invention permits the moisture of the shapes to be maintained and in fact increased to a slight extent thus permitting the temperature of the shapes to be raised rapidly. Thereafter, the passage of saturated gases to the kiln is discontinued and the shapes are permitted to soak for about 2–3 hours to permit hydration to proceed.

A second similar steaming period by the passage of heated saturated gases over the surfaces of the block (shape) is again effected for a period of about 1½ hours raising the temperature of the shapes to about 150° F. while maintaining moisture content substantially constant. Thereafter, passage of saturated gases is discontinued and a second soaking period of about 2½ hours is permitted. Again, passage of heated gases over the surfaces of the shapes is resumed and carried on for a period of about 1½–2 hours raising the temperature of the shapes to about 195° while maintaining the moisture content substantially constant. At the end of such period, supply of saturated gases to the kiln is discontinued and a soaking period of suitable duration, depending upon the length of the previous periods, is provided to complete hydration of the shape. It will be understood, of course, that the various steaming and soaking periods disclosed above may be varied depending upon the particular shape being cured. The described operation serves merely as an illustration of a suitable curing period which I have found highly satisfactory.

The blocks are then dried by again passing heated air having at least 85% saturation into the kiln for a period of from 3½–6 hours at a pressure and temperature such that the blocks will flash the required amount to meet local code requirements. The pressure in the kiln is no greater than 1″ water gauge and the passage of saturated gases or steam over the shapes permits the moisture therein to flash off thereby drying the blocks. I have found that there is approximately 30 minutes to one hour lag from the center to the exterior of each block at a surface temperature of the block of about 230° F. Preferably, during the flashing period, the temperature is maintained under 400° F. although it may be raised to 600° F. if desired. However, the heat loss at 600° F. is greater and thereby increases the cost of operation.

The process described permits the use of higher temperatures and lower pressures to release a greater amount of latent heat. By utilizing the latent heat of the gases supplied to the kiln, the cost of curing the shapes is greatly reduced. I have found in actual commercial runs that the cost of curing (steaming process only) is reduced from about .004¢ to .00133¢ utilizing fuel oil at 11.6¢ per gallon. Such a cost figure has never heretofore been attained to my knowledge. The flashing step of my curing procedure permits about 75% of the moisture in a shape to be removed thus assuring that the shape complies with code requirements.

I have found that some minor amount of carbon dioxide is liberated during the curing operation. Carbon dioxide during the early stages of the curing operation does not appear to exercise any beneficial effect on the shapes and may in fact be somewhat harmful; during the latter stages of hydration, however, the presence of a minor amount of carbon dioxide is highly beneficial for it appears to make the cementitious shapes harder and tougher. If desired, I may add a neutralizing acid or salt such as sodium hydroxide or potassium hydroxide to the water to react with the carbon dioxide during the earlier stages of the curing operation. In the latter stages, such neutralizer is omitted to permit the carbon dioxide to affect hydration thereby securing harder and tougher shapes.

As additional illustrations of applications to which the present invention is adapted, I have shown the heating apparatus utilized in vapor and vacuum heating systems. In Figure 6, the heating apparatus 2 is employed in conjunction with a typical two pipe vapor gravity system, shown at the left-hand side of the figure. It is also connected to a typical two pipe vacuum system, shown at the right-hand side of the figure. A make-up tank 90 is provided to supply water to nozzles 12, and is connected to the source of water supply through line 11. Condensate is returned from heater 2 to tank 90 through line 91. Steam is supplied to the heating systems through supply line 92.

Considering the vapor heating system, steam from line 92 passes to a heat exchanger 93 in area 32′ and is returned to tank 90 through return line 94. Suitable traps and vents are disposed in the system as is customary practice.

In the vacuum heating system, steam passes from supply line 92 to heat exchanger 96 disposed in area 32′ and is returned to tank 90 through return line 97. A booster 98 is provided in line 97 as is customary practice, booster 98 being regulated by thermostat T disposed in area 32′.

While in the illustrated systems I have shown only one heat exchanger it will be understood a plurality of exchangers may be provided disposed in various areas to be heated. The heating apparatus control system described in connection with the kiln application of Figure 5 is applicable in connection with the systems illustrated in Figure 6 and may be utilized as previously described to maintain desired temperatures in the areas being heated. Fan 77, return duct 79 and the skimmer arrangement shown in Figure 5 are not required in the arrangement shown in Figure 6 and may be omitted together with the accompanying controls.

My invention provides a simple, economical and easily adaptable low pressure heating device which can be readily incorporated into many low pressure systems now in use in addition to new installations with high temperature superheated steam available. My invention also provides a simple, economical and easily applied low pressure heating device which can readily be incorporated in a heating system which requires direct heat and moisture at a temperature below 212° F. with humidity and heat controlled to a close differential. The present invention provides a simple, economical and easily applied low pressure heating device which can readily be incorporated in a heating system which requires high temperatures. This may be of either a direct or indirect type and temperatures up to 750° F. are available.

By my device, the use of soluble and non-corrosive additives for purposes of fumigating, coloring or gas absorbing may be incorporated in direct heating projects. It will be understood that if desired automatic timing program equipment may be employed in operating the devices with a different temperature programmed for different intervals.

Utilizing latent heat rather than sensible heat to condition an area also reduces the costs of operation since a much smaller quantity of gases need be conveyed to the area to provide the same amount of heat. My heating device assures expansion of the heated gases and utilizes the forces of expansion at the low pressures maintained in the drum to supply the heated gases to the area being treated.

The advantages of my invention in its application to curing of cementitious modular shapes are derived primarily from the use of higher temperatures and lower pressures permitting the utilization of the latent heat of gases supplied to a kiln thus reducing the gaseous volume which need be heated and supplied. The flashing procedure is carried on at a pressure preferably no greater than atmospheric pressure and never greater than 1" water gauge. If necessary to maintain such slight pressure, an exhaust opening in the kiln may be provided. My invention obtains about a 30% increase in efficiency of fuel consumed.

While I have described and illustrated certain preferred embodiments of my invention, it will be understood my invention is not limited thereto since it may be otherwise embodied within the scope of the following claims.

I claim:

1. In heating apparatus for use in vacuum, vapor and low pressure heating systems, the combination of a cylindrical drum, a metallic cylinder extending longitudinally of the drum, means to eject a mixture of gas and oil into the cylinder and to ignite the same thereby heating the cylinder to at least 400° F., means for maintaining a predetermined static pressure in the cylinder, spray members for spraying liquid into the drum to change a substantial portion of the sensible heat of gases therein heated by the cylinder into latent heat, the volume of gases in the drum being increased greatly by the change from dry gases to saturated steam, and fan mechanism for maintaining a predetermined direction of flow of saturated steam in the drum.

2. Heating apparatus according to claim 1 in which the cylinder heating means comprises a direct fired cyclonic oil burner.

3. Heating apparatus according to claim 1 in which condensate collects on the interior wall of the drum to insulate heated gases from the ambient atmosphere.

4. In heating apparatus for use in a vacuum, vapor or low pressure heating system, the combination of a cylindrical drum forming a heating compartment, a metallic cylinder extending longitudinally of the compartment, means to eject a mixture of air and oil into the cylinder and to ignite the same thereby heating the cylinder to at least 400° F., means for maintaining a desired static pressure in the cylinder, spray members for spraying water into the compartment to change a substantial portion of the sensible heat of gases therein heated by the cylinder into latent heat, the volume of gases in the drum being increased greatly by the change from dry gases to saturated steam, a control to regulate the amount of water sprayed into the compartment in accordance with the temperature of saturated steam leaving the compartment, and fan mechanism for maintaining a predetermined direction of flow of saturated steam in the compartment.

5. Heating apparatus according to claim 4 in which a second control is provided to regulate the operation of the cylinder heating means in response to temperature of saturated steam leaving the drum.

6. Heating apparatus according to claim 5 in which a control is provided to maintain a desired pressure in the heating compartment in response to temperature of saturated steam leaving the drum.

7. A vacuum, vapor or low pressure heating system comprising heating apparatus for supplying at least 85% saturated steam, said apparatus including a horizontally extending cylindrical drum forming a compartment, a metallic cylinder extending longitudinally of the drum in the compartment, means to supply a mixture of air and oil to the cylinder and to ignite the same thereby heating the cylinder to at least 400° F., means for maintaining a desired static pressure in the cylinder, spray members in the compartment for spraying water into the compartment to change a substantial portion of the sensible heat of gases therein heated by the cylinder into latent heat, the volume of gases in the drum being increased greatly by the change from dry gases to saturated steam, means for maintaining a predetermined direction of flow of saturated steam in the drum, means for conveying the saturated steam to an area to be heated, and means for returning the saturated steam from said area.

8. A vacuum heating system according to claim 7 including controls to regulate the amount of water sprayed into the drum in accordance with the temperature of saturated steam leaving the drum, and for regulating the operation of the cylinder heating means in response to temperature of saturated steam leaving the drum.

9. A vacuum, vapor or low pressure heating system comprising heating apparatus for supplying at least 85% saturated steam, said apparatus including a horizontally extending, cylindrical drum forming a compartment, a metallic cylinder extending longitudinally of the drum in the compartment, means to supply a mixture of air and oil to the cylinder and to ignite the same thereby heating the cylinder to at least 400° F., means for maintaining a desired static pressure in the cylinder, spray members in the compartment for spraying water into the compartment to change a substantial portion of the sensible heat of gases therein heated by the cylinder into latent heat, the volume of gases in the drum being increased greatly by the change from dry gases to saturated steam, means for maintaining a predetermined direction of flow of saturated steam in the drum, the interior wall of the drum having a layer of condensate thereon serving to insulate the heated gases from the ambient atmosphere, means for conveying the saturated steam to an area to be heated, and means for returning the steam from said area.

10. A vacuum heating system according to claim 9 including a first control to regulate the amount of water sprayed into the drum in accordance with the temperature of saturated steam leaving the drum, a second control for regulating the operation of the cylinder heating means in response to temperature of saturated steam leaving the drum, and a third control for maintaining a desired pressure in the heating compartment in response to temperature of saturated steam leaving the drum.

(References on following page)

References Cited in the file of this patent

UNITED STATES PATENTS

| Number | Name | Date |
|---|---|---|
| 120,834 | Sprogle | Nov. 14, 1871 |
| 130,952 | Sprogle | Aug. 27, 1872 |
| 413,263 | Richardson | Oct. 22, 1889 |
| 681,580 | Rensing | Aug. 27, 1901 |
| 987,158 | Neilson | Mar. 21, 1911 |
| 992,891 | Loop | May 23, 1911 |
| 1,189,904 | Avram | July 4, 1916 |
| 1,264,142 | Bellonby | Apr. 30, 1918 |
| 1,471,765 | Wilson | Oct. 23, 1923 |
| 1,988,456 | Lysholm | Jan. 22, 1935 |
| 2,103,770 | Dunham et al. | Dec. 28, 1937 |
| 2,110,209 | Engels | Mar. 8, 1938 |
| 2,131,555 | Dunham et al. | Sept. 27, 1938 |
| 2,331,875 | Van Zandt | Oct. 19, 1943 |
| 2,377,480 | Cann | June 5, 1945 |
| 2,402,803 | Chandler | June 25, 1946 |
| 2,563,408 | Luzzatti et al. | Aug. 7, 1951 |

FOREIGN PATENTS

| Number | Country | Date |
|---|---|---|
| 10,274 | Great Britain | Apr. 29, 1911 |